US011099270B2

(12) United States Patent
Hennen et al.

(10) Patent No.: US 11,099,270 B2
(45) Date of Patent: Aug. 24, 2021

(54) THERMAL DISPLAY WITH RADAR OVERLAY

(71) Applicant: Lumineye, Inc., Boise, ID (US)

(72) Inventors: Corbin Joseph Hennen, Boise, ID (US); Megan Aileen Lacy, Marlton, NJ (US)

(73) Assignee: Lumineye, Inc., Boise, ID (US)

( * ) Notice: Subject to any disclaimer, the term of this patent is extended or adjusted under 35 U.S.C. 154(b) by 287 days.

(21) Appl. No.: 16/211,769

(22) Filed: Dec. 6, 2018

(65) Prior Publication Data
US 2020/0182998 A1 Jun. 11, 2020

(51) Int. Cl.
| | |
|---|---|
| *G01S 13/86* | (2006.01) |
| *G01S 13/04* | (2006.01) |
| *G01S 7/04* | (2006.01) |
| *G01S 13/89* | (2006.01) |
| *G01V 8/10* | (2006.01) |

(52) U.S. Cl.
CPC .............. *G01S 13/867* (2013.01); *G01S 7/04* (2013.01); *G01S 13/04* (2013.01); *G01S 13/89* (2013.01); *G01V 8/10* (2013.01)

(58) Field of Classification Search
CPC .......... G01S 13/867; G01S 7/04; G01S 13/04; G01S 13/89; G01V 8/10
USPC ......................................................... 342/53
See application file for complete search history.

(56) References Cited

U.S. PATENT DOCUMENTS

| | | | | |
|---|---|---|---|---|
| 5,517,196 A | * | 5/1996 | Pakett | ................... G01S 13/931 342/70 |
| 9,229,102 B1 | * | 1/2016 | Wright | .................. G01S 13/887 |
| 10,931,934 B2 | * | 2/2021 | Richards | .............. H04N 13/204 |
| 2001/0035836 A1 | * | 11/2001 | Miceli | .................... G01V 11/00 342/22 |
| 2002/0186228 A1 | * | 12/2002 | Kobayashi | ............. G02B 27/01 345/633 |

(Continued)

FOREIGN PATENT DOCUMENTS

| | | | |
|---|---|---|---|
| WO | WO-2018217498 A1 | * 11/2018 | ........... G06T 19/006 |
| WO | WO2018217498 A1 | 11/2018 | |

OTHER PUBLICATIONS

US Patent and Trademark Office—International Searching Authority; International Search Report and Written Opinion for Application No. PCT/US2019/062008 dated Mar. 30, 2020.

*Primary Examiner* — Vladimir Magloire
*Assistant Examiner* — Nuzhat Pervin
(74) *Attorney, Agent, or Firm* — Parsons Behle & Latimer (57) ABSTRACT

A system that may be used to detect objects in front and behind of a barrier, such as a wall. The system includes a processor, a radar device, a thermal image device, and a display each being connected to the processor. The system detects objects based on reflected signals from the radar device and objects based on infrared light. The display shows at the same time objects detected by either the radar device or the thermal image device. A size of a displayed objects may be reduced based on the distance the object is from the system. The processor may be configured to discard objects detected by the radar device that are located in front of the barrier. The system may display objects located in front of the barrier detected by the thermal image device overlaid with objects located behind the barrier detected by the radar device.

20 Claims, 4 Drawing Sheets

(56) References Cited

U.S. PATENT DOCUMENTS

| | | | |
|---|---|---|---|
| 2005/0099331 A1* | 5/2005 | Steinway | H01Q 1/273 342/22 |
| 2005/0195383 A1* | 9/2005 | Breed | B60N 2/28 356/4.01 |
| 2005/0278098 A1* | 12/2005 | Breed | G01S 7/0235 701/45 |
| 2006/0019709 A1* | 1/2006 | Kim | H04L 1/0016 455/562.1 |
| 2006/0197019 A1* | 9/2006 | Satou | G02B 27/01 250/338.1 |
| 2007/0090989 A1* | 4/2007 | Weil | G01S 13/867 342/22 |
| 2007/0182528 A1* | 8/2007 | Breed | G01S 11/12 340/435 |
| 2008/0040004 A1* | 2/2008 | Breed | B60R 21/0134 701/45 |
| 2008/0046150 A1* | 2/2008 | Breed | B60R 21/0134 701/45 |
| 2008/0119993 A1* | 5/2008 | Breed | G01S 7/023 701/46 |
| 2008/0259079 A1* | 10/2008 | Boxman | G06T 15/08 345/424 |
| 2009/0002220 A1* | 1/2009 | Lovberg | G01S 13/913 342/33 |
| 2009/0033548 A1* | 2/2009 | Boxman | G01S 13/888 342/179 |
| 2009/0135045 A1* | 5/2009 | Beeri | G01S 7/415 342/22 |
| 2009/0243916 A1* | 10/2009 | Beeri | G01S 7/20 342/179 |
| 2009/0295618 A1* | 12/2009 | Beeri | G01S 13/89 342/22 |
| 2010/0057305 A1* | 3/2010 | Breed | G08G 1/166 701/47 |
| 2013/0113647 A1* | 5/2013 | Sentelle | G01S 13/887 342/22 |
| 2013/0222172 A1* | 8/2013 | Sentelle | G01S 13/888 342/22 |
| 2014/0055297 A1* | 2/2014 | Beeri | G01S 13/003 342/21 |
| 2015/0177374 A1* | 6/2015 | Driscoll | G01S 13/887 342/22 |
| 2015/0301167 A1* | 10/2015 | Sentelle | G01S 13/888 342/22 |
| 2015/0309166 A1* | 10/2015 | Sentelle | G01S 13/887 342/22 |
| 2016/0223668 A1* | 8/2016 | Driscoll | H01Q 1/425 |
| 2017/0307735 A1* | 10/2017 | Rohani | G01S 17/89 |
| 2017/0336505 A1* | 11/2017 | Driscoll | H01Q 1/425 |
| 2018/0188351 A1* | 7/2018 | Jones | G01S 5/18 |

* cited by examiner

THERMAL DISPLAY WITH RADAR OVERLAY

BACKGROUND

Field of the Disclosure

The examples described herein relate to a system that includes a radar device and a thermal image device that may be used to detect objects in front and behind of a barrier, such as a wall. The system includes a display used to display objects detected by the system.

Description of the Related Art

Military, law enforcement, and/or emergency personnel, such as first responders, may enter a structure without being able to identify objects and/or individuals merely by sight. For example, darkness and/or smoke within the structure may prevent the identification of objects and/or individuals. Thermal detection devices may aid in the detection of some objects, such as individuals, within a room. However, thermal detection devices only detect objects that are emitting infrared light. Thus, a thermal detection device may not provide an adequate representation of a room. Additionally, thermal detection devices are not able to detect objects through a barrier, such as a wall, and it may be important to be able to detect an individual and/or object positioned on the other side of a barrier. For example, it may be important to determine whether an individual is positioned on the other side of a wall.

Radar devices may be used to detect objects in a structure including through a barrier. While radar devices may detect an object, conventional radar devices are not able to differentiate the detected object. For example, conventional radar devices do not provide accuracy in detection and typically do not provide a shape of the object or whether the object is an individual or some other object. Information concerning the detected objects may be important depending on the application. Significant computing power may be required to be able to discern objects, people, and/or shapes of objects using a radar device. The significant computing power may require processing time making it difficult to detect and discern objects in real-time, which may be critical depending on the application. Other disadvantages may exist.

SUMMARY

The present disclosure is directed to a system that includes a radar device and a thermal image device that may be used to detect objects in front and behind of a barrier, such as a wall. The system includes a display used to display objects detected by the system.

One embodiment of the present disclosure is a system comprising one or more processors. The system comprises one or more radar devices connected to the one or more processors. The one or more radar devices configured to transmit signals and detect objects located within a detection range of the one or more radar devices based on reflected signals. The system includes one or more thermal image devices connected to the one or more processor. The one or more thermal image devices configured to detect objects in view of the one or more thermal image devices based on infrared light emitted by the objects. The system comprises one or more displays connected to the one or more processors. The one or more processors causes the one or more displays to display the objects detected by the one or more radar devices. The one or more processors causes the one or more displays to display the objects detected by the one or more thermal image devices.

The detection range of the system may be within 100 feet. The one or more processors may cause the one or more displays to reduce a size of the object being displayed the farther the object is located from the one or more displays. The one or more radar devices may comprise at least one ultrawide band radar and the one or more thermal image devices may comprise at least one thermal camera. The one or more radar devices detect objects through a barrier. The one or more processors may be configured to discard objects that are located in front of the barrier that are detected by the one or more radar devices.

The one or more processors may cause the one or more displays to display objects in front of the barrier detected by the one or more thermal image devices and display objects behind the barrier detected by the one or more radar devices. The one or more displays may be augmented reality glasses, a watch, a head mounted display, a smart phone, or the like. The system may include an audio device connected to the one or more processors, wherein the one or more processors causes the audio device to audibly indicate a detection of objects. The one or more processors may cause the one or more displays to differentiate objects detected in front of the barrier from objects detected behind the barrier. The one or more displays may display objects in different colors, display the objects with different opacities, display the objects with different outlines, display the objects with different shapes, or display labels to differentiate the objects. The one or more processors may determine a distance to the barrier.

The one or more processors may use the one or more radar devices or the one or more thermal image devices to determine the distance to the barrier. The system may include a sensor, wherein the sensor measures the distance to the barrier and communicates the distance to the one or more processors. The sensor may be a camera, an ultrasonic transducer, an acoustic sensor, a light detection and ranging device, a laser rangefinder, or the like.

One embodiment of the present disclosure is a method of detecting objects. The method comprises transmitting signals and detecting objects based on reflected signals. The method includes detecting objects based on emitted infrared light. The method includes displaying objects detected in front of a barrier based on the emitted infrared light and displaying objects detected behind the barrier based on the reflected signals. The method may include discarding objects detected in front of the barrier based on the reflected signals. The method may comprise differentiating objects detected in front of the barrier from objects detected behind the barrier on a display. The method may include measuring a distance to the barrier.

One embodiment of the present disclosure is an apparatus comprising a processor and a radar device connected to the processor. The radar device is configured to transmit signals and detect objects located within a detection range of the radar device based on reflected signals. The apparatus comprises a thermal camera connected to the processor. The thermal camera is configured to detect objects in view of the thermal camera based on infrared light emitted by the objects. The apparatus includes a display connected to the processor. The processor causes the display to display to objects detected by the radar device and the processor causes the display to display the objects detected by the thermal camera. The apparatus may include an audio device connected to the processor. The processor causes the audio device to audibly announce a detection of an object.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 1:
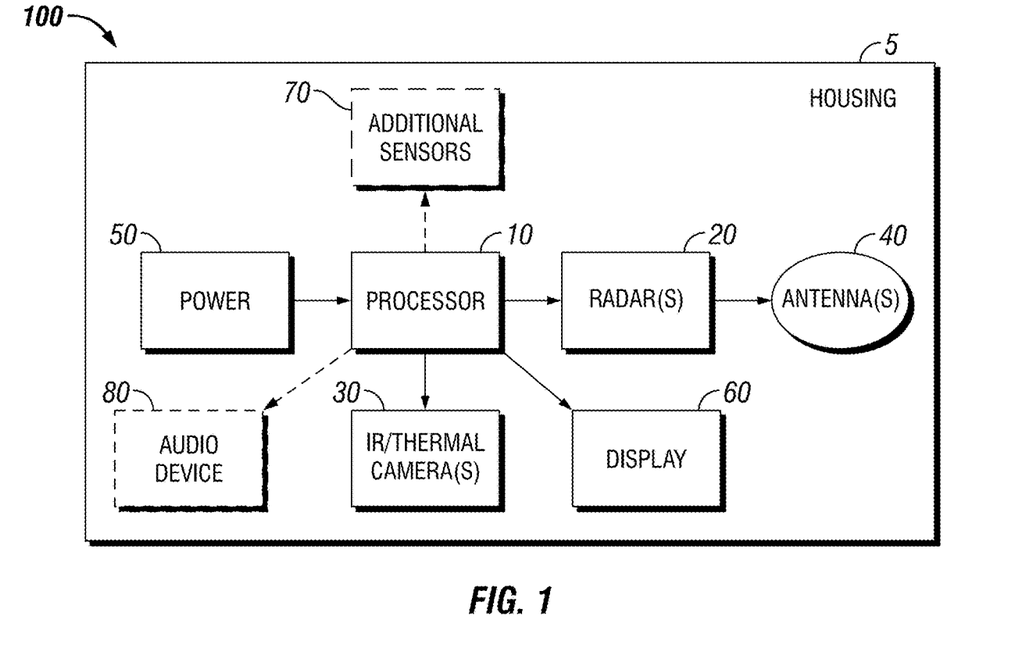
FIG. 1 is a box diagram of an embodiment of a detection apparatus.

FIG. 1 is a box diagram of an embodiment of a detection apparatus 100. The apparatus 100 includes a processor 10 positioned within a housing 5. Although FIG. 1 shows a single processor 10, the apparatus 100 may include one or more processors 10 as would be appreciated by one of ordinary skill in the art having the benefit of this disclosure. The processor 10 may be a central processing unit, a microcontroller, a computer, or any other similar electronic device equipped to process data as would be appreciated by one of ordinary skill in the art having the benefit of this disclosure.

The apparatus 100 includes a radar device 20 and an antenna 40 connected to the radar device 20. Although FIG. 1 shows a single radar device 20 and a single antenna 40, the apparatus 100 may include one or more radar devices 20 and one or more antennas 40 as would be appreciated by one of ordinary skill in the art having the benefit of this disclosure. The radar device 20 is connected to the processor 10 of the apparatus 100. The radar device 20 transmits signals from the apparatus 100 and detects objects located within the vicinity of the radar device 20 based on signals reflected of the objects as would be appreciated by one of ordinary skill in the art having the benefit of this disclosure. The radar device 20 may be configured to detect objects within a certain range, i.e. a certain distance from the radar device 20. The range may be varied depending on the application. For example, the range may be, but is not limited to, 100 feet from the radar device 20. The range may be more or less than 100 feet.

The radar device 20 combined with the antenna 40 is configured to transmit signals from the radar device 20 and receive reflected signals to determine the location of objects from which the signals are reflected. The antenna 40 may be an integral component of the radar device 20. The radar device 20 may include an integral processor or processing unit used to analyze the received reflected signals. Data concerning the received reflected signals may be transmitted to the processor 10 for analysis. The radar device 20 may be directly connected to the processor 10 or may be wirelessly connected to the processor 10. The radar device 20 may be an ultrawide band radar. The radar device 20 may comprise various other radar devices configured to transmit signals and receive reflected signals for the detection of objects as would be appreciated by one of ordinary skill in the art having the benefit of this disclosure.

The apparatus 100 includes a thermal imaging device 30. Although FIG. 1 shows a single thermal imaging device 30, the apparatus 100 may include one or more thermal imaging devices 30 as would be appreciated by one of ordinary skill in the art having the benefit of this disclosure. The thermal imaging device 30 is connected to the processor 10 of the apparatus 100. The thermal imaging device 30 detects objects located within the vicinity of the thermal imaging device 30 based on infrared light emitted from objects as would be appreciated by one of ordinary skill in the art having the benefit of this disclosure. The thermal imaging device 30 may be configured to detect objects within a certain range, i.e. a certain distance from the thermal imaging device 30. The range may be varied depending on the application. For example, the range may be, but is not limited to, 100 feet from the thermal imaging device 30. The range may be more or less than 100 feet.

The thermal imaging device 30 may include an integral processor or processing unit used to analyze the emitted infrared light that is detected by the thermal imaging device 30. Data concerning the emitted infrared light may be transmitted to the processor 10 for analysis. The thermal imaging device 30 may be directly connected to the processor 10 or may be wirelessly connected to the processor 10. The thermal imaging device 30 may be a thermal camera. The thermal imaging device 20 may comprise various other thermal imaging devices configured to detect emitted infrared light for the detection of objects as would be appreciated by one of ordinary skill in the art having the benefit of this disclosure.

The apparatus 100 includes a power source, or power supply, 50 and a display 60. The power source 50 may be a battery or other various other power sources as would be appreciated by one of ordinary skill in the art having the benefit of this disclosure. Although FIG. 1 shows a single power source 50 and a single display 60, the apparatus 100 may include one or more power sources 50 and one or more displays 60 as would be appreciated by one of ordinary skill in the art having the benefit of this disclosure. The power source 50 and the display 60 are each connected to the processor 10 of the apparatus 100. The display 60 is configured to display objects detected by both the radar device 20 and the thermal imaging device 30.

The processor 10 of the apparatus 100 is configured to overlay objects detected by the thermal device 30 with the objects detected by the radar device 20 onto the display 60. The display 60 may be directly connected to the processor 10 or may be wirelessly connected to the processor 10. The processor 10 may be configured to display the detected objects on multiple displays wirelessly connected to the processor 10. For example, the detected objects may be displayed on the screen of multiple smart phones wirelessly connected to the processor 10. The display 60 may take various forms. For example, the display 60 may be augmented reality glasses, a watch, a head mounted display, a smart phone, or the like.

The processor 10 may be configured to differentiate the objects detected by the radar device 20 from the objects detected by the thermal imaging device 30. For example, the processor 10 may cause the appearance of objects detected by the radar device 20 to be different from the objects detected by the thermal imaging device 30. Likewise, the processor 10 may be configured to differentiate the objects detected in front of a barrier 400 (shown in FIGS. 3-5), such as a wall, from the objects detected behind the barrier 400. For example, the processor 10 may cause the appearance of objects located in front of the barrier 400 to be different from the objects located behind the barrier 400. The processor 10 may differentiate the objects by displaying in different colors, displaying with different opacities, displaying with different outlines, displaying with different shapes, displaying with labels, or the like.

The radar device 20 may be used to detect objects located in front and/or behind a barrier 400. The thermal image device 30 may be used to detect objects located in front of a barrier 400. The thermal image device 30 may be able to detect objects that used to be located in front of a barrier 400. For example, infrared light may be emitted from a surface of a barrier 400 upon which a portion of an individual, such as a hand, was previously placed. In one embodiment, the processor 10 may be configured to use reflected signals from the radar device 20 to detect objects behind a barrier 400, use the thermal image device 30 to detect objects in front of the barrier 400, and use reflected signals from the radar device 20 that are reflected off of the objects from the radar device to determine data regarding the objects located in front of the barrier 400. For example, the radar device 20 may be used to obtain heartrate data of an individual positioned in front of the barrier 400. The radar device 20 may be used to obtain various other data about an object in front of the barrier 400 as would be appreciated by one of ordinary skill in the art having the benefit of this disclosure.

In one embodiment, the processor 10 may be configured to ignore the reflected signals from objects located in front of a barrier 400 from the signals transmitted from the radar device 20. The processor 10 may combine the objects detected in front of the barrier 400 that are detected from the thermal imaging device 30 with objects detected behind the barrier 400 that are detected from the radar device 20 and cause the display 60 to display all of the detected objects. As discussed herein, the processor 10 may cause the objects to be differentiated when displayed by the display 60. For example, the size of displayed object may be reduced based on the distance the object is located from the apparatus 100.

The apparatus 100 may be configured to determine a distance from the apparatus 100 to a barrier 400. The apparatus 100 may measure the distance to the barrier 400 using the radar device 20 and/or the thermal imaging device 30. The apparatus 100 may include an additional sensor or sensors 70. The sensor 70 may be used to measure the distance to the barrier 400 from the apparatus 100. Various sensors 70 may be used to measure the distance. For example, the sensor 70 may be, but is not limited to, a camera, an ultrasonic transducer, an acoustic transducer, a light detection and ranging device, a laser rangefinder, or the like.

The apparatus 100 may include an audio device 80. The audio device 80 is connected to the processor 10. The processor 10 may cause the audio device 80 to audibly indicate the detection of an object by the apparatus 100. The processor 10 may cause the audio device 80 to audibly indicate information about an object. For example, the audio device 80 may indicate an individual has been detected and/or may indicate the location of the detected object with respect to the apparatus 100. The audio device 80 may be, but is not limited to, a speaker, wired headphones, wireless headphones, or the like.

Figure 2:
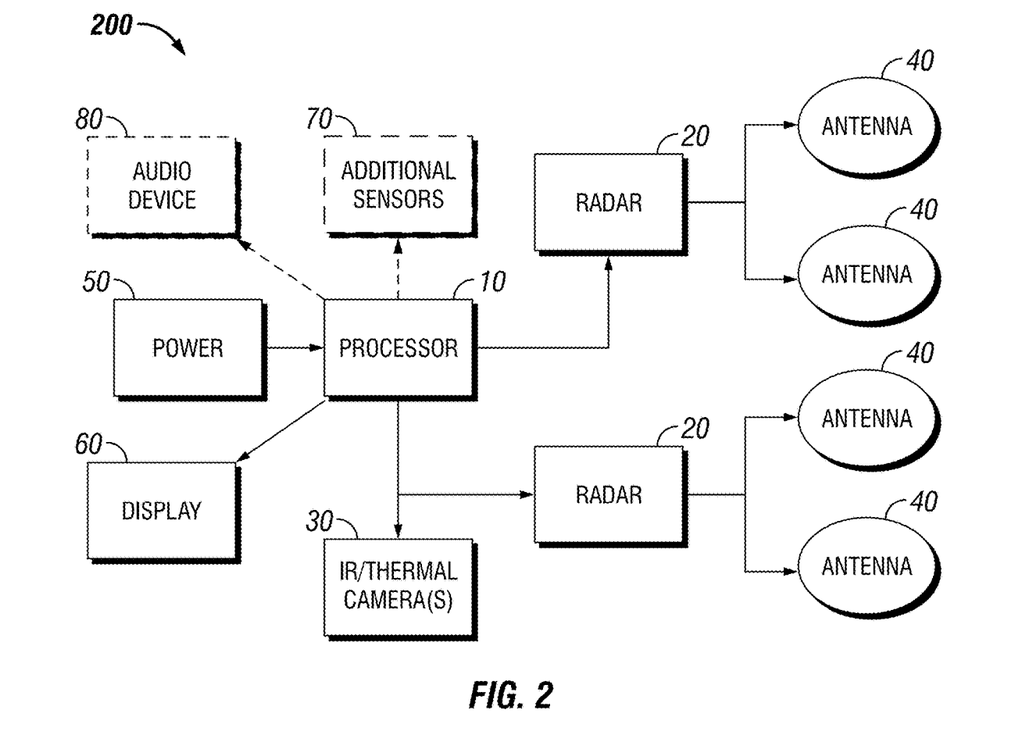
FIG. 2 is a box diagram of an embodiment of a detection system.

FIG. 2 is a box diagram of an embodiment of a detection system 200. The detection system 200 includes a processor 10 connected to multiple radar devices 20, a thermal imaging device 30, multiple antennas 40, a power supply 50, a display 60, an optional sensor or sensors 70, and an optional audio device 80. As discussed herein, the processor 10 uses the radar devices 20 and the thermal imaging device 30 to detect objects located in front and behind a barrier 400 (shown in FIG. 3), such as a wall, door, or the like. The objects detected by both the radar devices 20 and the thermal imaging device 30 may be displayed together on the display 60.

The processor 10 may differentiate the displayed objects so that a user can determine objects located in front of a barrier 400 from objects located behind the barrier 400. The system 200 may include multiple antennas 40 for each radar device 20. The antennas 40 may be incorporated or integral with the radar device 20. In regard to FIG. 1, the detection apparatus 100 may incorporate multiple components (i.e. processor 10, radar device 20, thermal imaging device 30, antenna 40, power supply 50, display 60, optional sensor 70, and optional audio device 80) into a single housing. Whereas a detection system 200 may couple a radar device 20, a thermal imaging device 30, an antenna 40, a power supply 50, and a display 60 to at least one processor 10, but each component may not be positioned within a common housing. The detection system 200 may also couple one or more sensors 70 to the at least one processor 10 and/or one or more audio devices 80 to the at least one processor 10.

Figure 3:
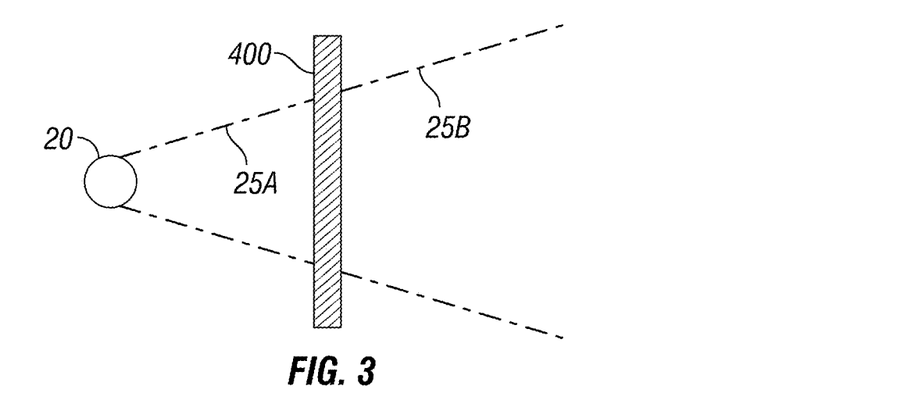
FIG. 3 is a schematic of a radar device transmitting signals through a barrier.

FIG. 3 is a schematic of a radar device 20 transmitting signals 25A, 25B for the detection of objects. As shown in FIG. 3, a portion 25A of the signals travels from the radar device 20 to the barrier 400 and a portion 25B travels through the barrier 400 and may be used to detect objects positioned behind the barrier 400 with respect to the radar device 20. Signals reflected of the objects back to the radar 20 may be used to detect the objects as would be recognized by one of ordinary skill in the art having the benefit of this disclosure.

Figure 4:
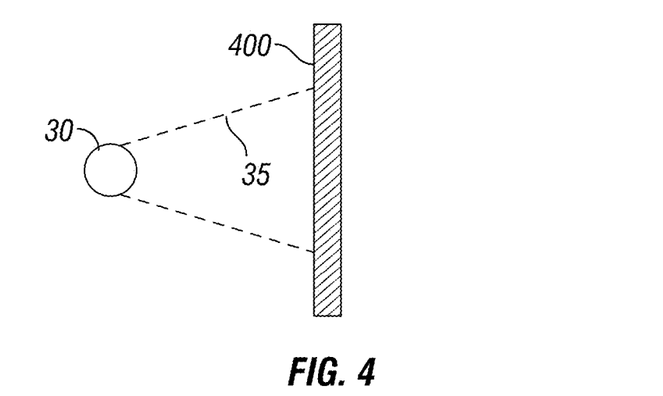
FIG. 4 is schematic of a field of view of a thermal image device.

FIG. 4 is a schematic of a thermal imaging device 30 with a field of view 35 to detect emitted infrared light. The field of view 35 of the thermal imaging device 30 does not penetrate the barrier 400. The thermal imaging device 30 cannot detect objects positioned behind the barrier 400 with respect to the thermal imaging device 30.

Figure 5:
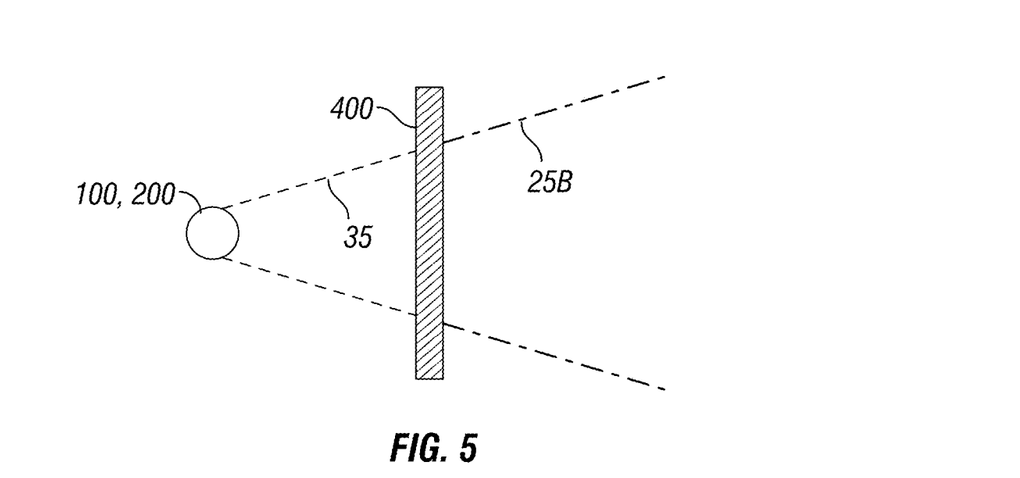
FIG. 5 is schematic of an embodiment of a detection apparatus or detection system positioned adjacent to a barrier.

FIG. 5 is schematic of an embodiment of a detection apparatus 100 or detection system 200 positioned adjacent to a barrier 400. The detection apparatus/detection system 100, 200 includes at least one radar device 20 (not shown in FIG. 5) and at least one thermal imaging device 30 (not shown in FIG. 5). The detection apparatus/detection system 100, 200 uses the field of view 35 of the at least one thermal imaging device 30 to detect objects located in front of the barrier 400 with respect to the detection apparatus/detection system 100, 200 as discussed herein. The detection apparatus/detection system 100, 200 uses signals 25B from the at least one radar device 20 to detect objects located behind the barrier 400 with respected to the detection apparatus/detection system 100, 200 as discussed herein. The detection apparatus/detection system 100, 200 may be configured to display together objects detected in front of the barrier 400 and objects detected behind of the barrier 400 on one or more display devices 60 (not shown in FIG. 5.) The detection apparatus/detection system 100, 200 may be configured to ignore reflected signals received from the one or more radar devices 20 for objects in front of the barrier 400 with respect to the detection apparatus/detection system 100, 200.

Figure 6:
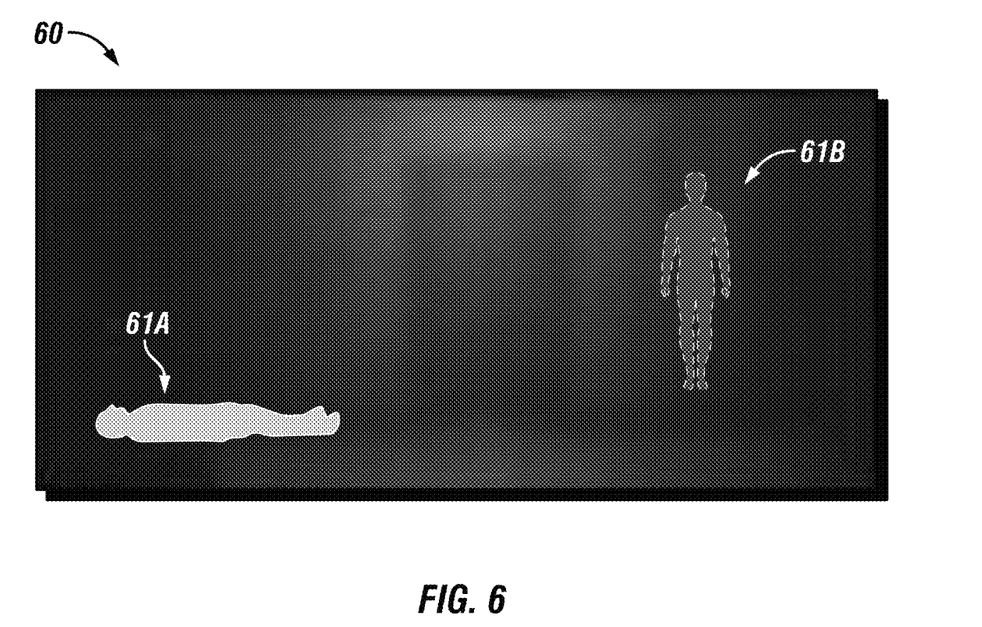
FIG. 6 is a schematic of an embodiment displaying objects detected by a detection apparatus or a detection system.

FIG. 6 is a schematic of an embodiment displaying objects 61A, 61B detected by a detection apparatus 100 or a detection system 200. The display 60 shows a first object 61A that is located in front of a barrier 400. The first object 61A is detected by a thermal imaging device 30 of the detection apparatus 100/detection system 200. The detection apparatus 100/detection system 200 may be configured to determine whether the first object 61A is a human. If the detection apparatus 100/detection system 200 determines that the first object 61A is a human, a silhouette of an individual is displayed on the display 60. As shown in FIG. 6, the silhouette for the first object 61A indicates that the detected individual is a prone position.

The display 60 shows a second object 61B has been detected with the second object being located behind a barrier 400. The second object 61B is detected by a radar device 20 of the detection apparatus 100/detection system 200. As discussed herein, the detection apparatus 100/detection system 200 may be configured to determine whether the second object 61B is human. If the detection apparatus 100/detection system 200 determines that the second object 61B is a human, a silhouette of an individual is displayed on the display 60. As shown in FIG. 6, the silhouette for the second object 61B indicates that the detected individual is a standing position. The detection apparatus 100/detection system 200 may be configured to differentiate between objects detected that are located in front of a barrier 400 and objects detected that are located behind a barrier 400. For example, objects positioned behind a barrier 400 may include a dashed outline.

The shape, size, location, and/or configuration of the objects 61A, 61B shown in FIG. 6 are for illustrative purposes and may be varied depending on the application as would be appreciated by one of ordinary skill in the art having the benefit of this disclosure. Various methods or mechanisms may be used to differentiate objects based on location and/or type as would be appreciated by one of ordinary skill in the art having the benefit of this disclosure. For example, the detection apparatus 100/detection system 200 may display objects in different colors, different opacities, different outlines, different shapes, and/or display labels to differentiate objects.

Figure 7:
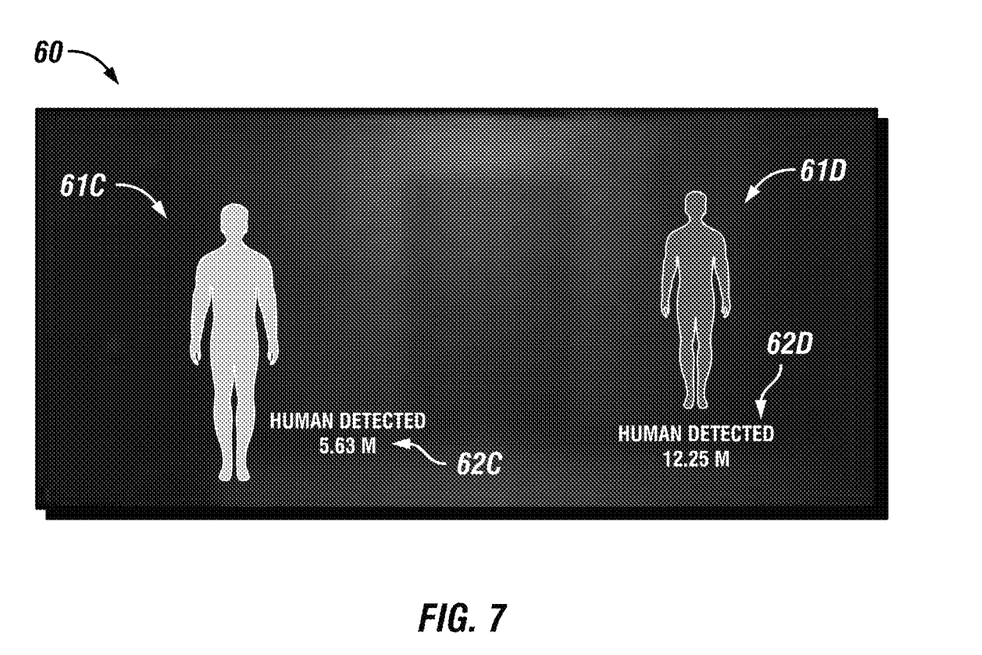
FIG. 7 is a schematic of an embodiment displaying objects detected by a detection apparatus or a detection system.

FIG. 7 is a schematic of an embodiment displaying objects 61C, 61D detected by a detection apparatus 100 or a detection system 200. The display 60 shows an object 61C that is located in front of a barrier 400. The object 61C is detected by a thermal imaging device 30 of the detection apparatus 100/detection system 200. The detection apparatus 100/detection system 200 may be configured to determine whether the object 61C is a human. If the detection apparatus 100/detection system 200 determines that the object 61C is a human, a silhouette of an individual is displayed on the display 60.

The display 60 shows another object 61D has been detected with the object 61D being located behind a barrier 400. The object 61D is detected by a radar device 20 of the detection apparatus 100/detection system 200. As discussed herein, the detection apparatus 100/detection system 200 may be configured to determine whether the object 61D is human. If the detection apparatus 100/detection system 200 determines that the object 61D is a human, a silhouette of an individual is displayed on the display 60. The detection apparatus 100/detection system 200 may be configured to differentiate between objects detected that are located in front of a barrier 400 and objects detected that are located behind a barrier 400. For example, an object 61D positioned behind a barrier 400 may be displayed having a smaller size with respect to an object 61C located in front of the barrier 400. Additionally, the detection apparatus 100/detection system 200 may also display a label 62C, 62D located adjacent to a detected object 61C, 61D. The labels 62C, 62D may indicate various information, such as but not limited to, a distance to an object and/or a type of object.

The shape, size, location, and/or configuration of the objects 61C, 61D and labels 62C, 62D are shown in FIG. 7 for illustrative purposes and may be varied depending on the application as would be appreciated by one of ordinary skill in the art having the benefit of this disclosure. Various methods or mechanisms may be used to differentiate objects based on location and/or type as would be appreciated by one of ordinary skill in the art having the benefit of this disclosure. For example, the detection apparatus 100/detection system 200 may display objects in different colors, different opacities, different outlines, different shapes, and/or display labels to differentiate objects.

Figure 8:
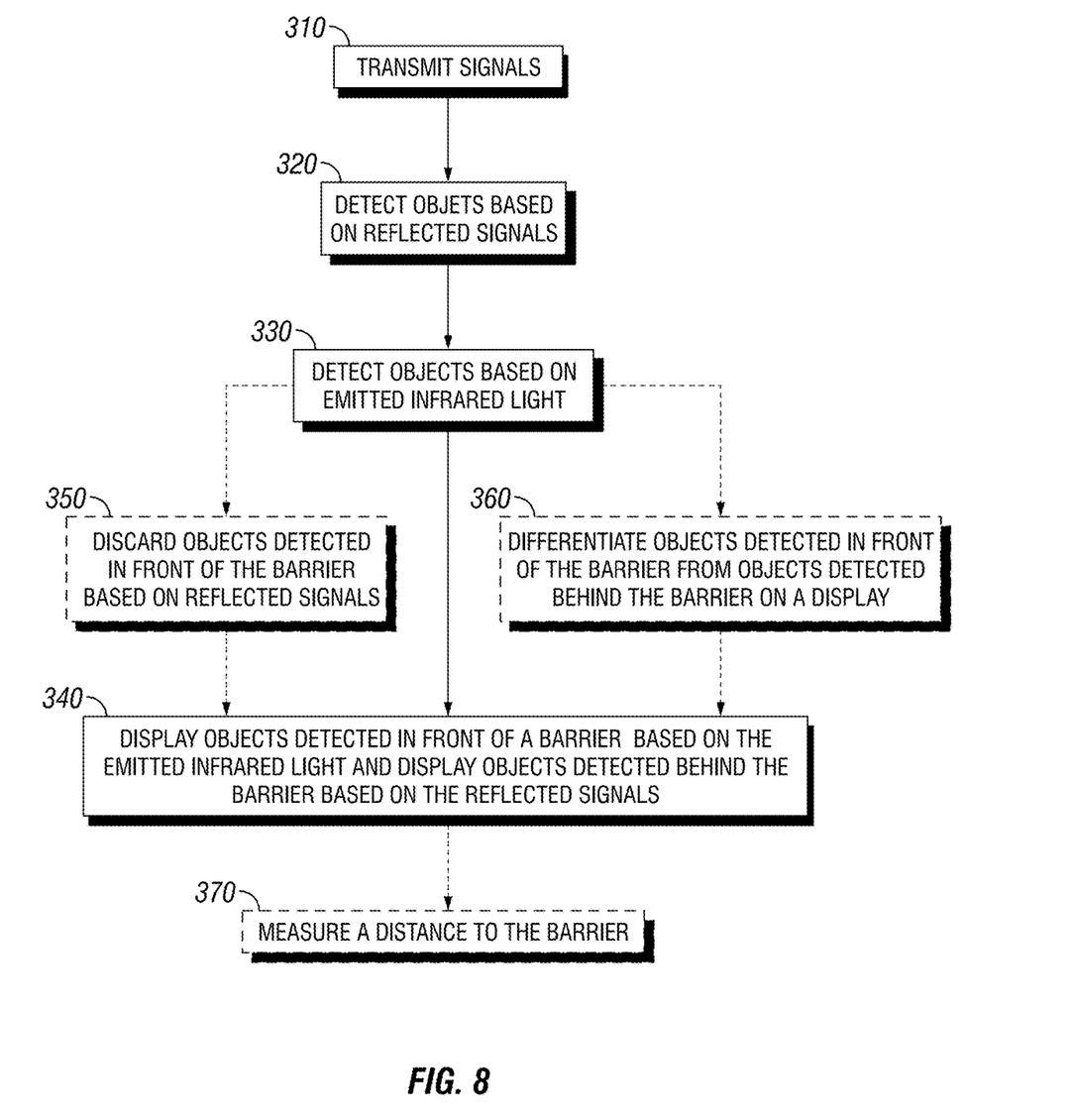
FIG. 8 is a flow chart of an embodiment of a method of detecting objects.

FIG. 8 is a flow chart of an embodiment of a method 300 of detecting objects. The method 300 includes transmitting signals, at 310. For example, signals are transmitted by a radar device 20. The method 300 includes detecting objects based on reflected signals, at 320. The method 300 includes detecting objects based on emitted infrared light, at 330. For example, a thermal imaging device 30 may detect infrared light emitted from an object. The method 300 includes displaying objects detected in front of a barrier based on the emitted infrared light and displaying objects detected behind the barrier based on the reflected signals, at 340. For example, objects detected by a thermal image device 30 may be displayed on a display 60 along with objects detected by a radar device 20. The thermal image device 30 may detect objects located in front of a barrier 400 and the radar device may detect objects located behind the barrier 400.

The method 300 may include discarding objected detected in front of the barrier based on reflected signals, at 350. For example, the processor 10 of a detection apparatus 100 or detection system 200 may be configured to ignore signals reflected off objects located in front of a barrier 400 with respect to the location of the radar device 20. The method 300 may include differentiating objects detected in front of the barrier from objects detected behind the barrier on a display, at 360. For example, the detection apparatus 100/detection system 200 may display objects in different colors, different opacities, different outlines, different shapes, and/or display labels to differentiate objects. The method 300 may include measuring a distance to the barrier, at 370. For example, the detection apparatus 100/detection system 200 may use the radar device 20 and/or the thermal imaging device 30 to measure a distance from the detection apparatus 100/detection system 200 to a barrier. Alternatively, the detection apparatus 100/detection system 200 may use a sensor 70 to measure a distance from the detection apparatus 100/detection system 200 to a barrier.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A system comprising:
   one or more processors;
   one or more radar devices connected to the one or more processors, the one or more radar devices configured to transmit radio waves and detect objects located within a detection range of the one or more radar devices based on reflected radio waves;
   one or more thermal image devices connected to the one or more processors, the one or more thermal image devices configured to detect objects in view of the one or more thermal image devices based on infrared light emitted by the objects;
   one or more displays connected to the one or more processors, wherein the one or more processors causes the one or more displays to display the objects detected by the one or more radar devices and wherein the one or more processors causes the one or more displays to display the objects detected by the one or more thermal image devices;
   wherein the one or more radar devices detect objects through a barrier; and
   wherein the one or more processors cause the one or more displays to display objects in front of the barrier detected by the one or more thermal image devices and display objects behind the barrier detected by the one or more radar devices.

2. The system of claim 1, wherein the detection range is within 100 feet.

3. The system of claim 1, wherein the one or more processors causes the one or more displays to reduce a size of the object being displayed the farther the object is located from the one or more displays.

4. The system of claim 1, wherein the one or more radar device comprises at least one ultrawide band radar and wherein the one or more thermal image devices comprises at least one thermal camera.

5. The system of claim 1, wherein the one or more processors are configured to discard objects that are located in front of the barrier that are detected by the one or more radar devices.

6. The system of claim 1, wherein the one or more displays comprises augmented reality glasses, a watch, a head mounted display, or a smart phone.

7. The system of claim 1, comprising an audio device connected to the one or more processors, wherein the one or more processor causes the audio device to audibly indicate a detection of objects.

8. The system of claim 7, wherein the one or more processors causes the audio device to audibly indicate a location of detected objects.

9. The system of claim 1, wherein the one or more processors causes the one or more displays to differentiate objects detected in front of the barrier from objects detected behind the barrier.

10. The system of claim 9, wherein the one or more displays display the objects in different colors, display the objects with different opacities, display the objects with different outlines, display the objects with different shapes, or display labels to differentiate the objects.

11. The system of claim 1, wherein the one or more processors determines a distance to the barrier.

12. The system of claim 11, wherein the one or more processors uses the one or more radar devices or the one or more thermal image devices to determine the distance to the barrier.

13. The system of claim 11, comprising a sensor connected to the one or more processors, wherein the sensor measures the distance to the barrier and communicates the distance to the one or more processors.

14. The system of claim 13, wherein the sensor comprises a camera, an ultrasonic transducer, an acoustic sensor, a light detection and ranging device, or a laser rangefinder.

15. A method of detecting objects comprising:
   transmitting signals;
   detecting objects based on reflected signals;
   detecting objects based on emitted infrared light; and
   displaying objects detected in front of a barrier based on the emitted infrared light on a display and simultaneously displaying objects detected behind the barrier based on the reflected signals on the display, wherein the objects detected based on the reflected signals are overlaid with the objects detected based on the emitted infrared light.

16. The method of claim 15, comprising discarding objects detected in front of the barrier based on the reflected signals.

17. The method of claim 15, comprising differentiating objects detected in front of the barrier from objects detected behind the barrier on a display.

18. The method of claim 17, comprising measuring a distance to the barrier.

19. An apparatus comprising:
   a processor;
   a radar device connected to the processor, the radar device is configured to transmit signals and detect objects located within a detection range of the radar device based on reflected signals, wherein the signals are radio waves;
   a thermal camera connected to the processor, the thermal camera is configured to detect objects in view of the thermal camera based on infrared light emitted by the objects; and
   a display connected to the processor, wherein the processor causes the display to display the objects detected by the radar device and wherein the processor causes the display to display the objects detected by the thermal camera.

20. The apparatus of claim 19, an audio device connected to the processor, the processor causes the audio device to audibly announce a detection of an object.

* * * * *